(12) United States Patent
Kroll et al.

(10) Patent No.: US 9,297,648 B2
(45) Date of Patent: Mar. 29, 2016

(54) VEHICLE WHEEL ALIGNMENT TECHNOLOGY

(71) Applicants: William P. Kroll, Medina, MN (US); Randie Evenson, Blaine, MN (US)

(72) Inventors: William P. Kroll, Medina, MN (US); Randie Evenson, Blaine, MN (US)

(73) Assignee: Intercomp Company, Medina, MN (US)

( * ) Notice: Subject to any disclaimer, the term of this patent is extended or adjusted under 35 U.S.C. 154(b) by 289 days.

(21) Appl. No.: 13/781,402

(22) Filed: Feb. 28, 2013

(65) Prior Publication Data

US 2013/0239420 A1    Sep. 19, 2013

Related U.S. Application Data

(60) Provisional application No. 61/604,642, filed on Feb. 29, 2012.

(51) Int. Cl.
*G01B 11/27*    (2006.01)
*G01B 11/275*    (2006.01)

(52) U.S. Cl.
CPC ........ *G01B 11/275* (2013.01); *G01B 2210/283* (2013.01)

(58) Field of Classification Search
CPC .............................. G01B 11/275; G01B 5/255
USPC ........................... 33/203.12, 203.18, 228, 288
See application file for complete search history.

(56) References Cited

U.S. PATENT DOCUMENTS

| 3,445,936 | A | * | 5/1969 | Wilkerson | 33/288 |
|---|---|---|---|---|---|
| 4,261,108 | A | * | 4/1981 | Davis | 33/301 |
| 4,303,338 | A | * | 12/1981 | Morrison et al. | 356/155 |
| 5,446,967 | A | * | 9/1995 | Gender | 33/203.18 |
| 6,082,011 | A | * | 7/2000 | Phillips, III | 33/203.15 |
| 6,226,879 | B1 | * | 5/2001 | Baird | 33/203.18 |
| 6,483,577 | B2 | * | 11/2002 | Stieff | 356/139.09 |
| 7,152,333 | B1 | * | 12/2006 | Chou | 33/203.18 |
| 8,136,259 | B2 | * | 3/2012 | Torri et al. | 33/203.18 |
| 8,341,848 | B2 | * | 1/2013 | Stieff et al. | 33/203.18 |
| 2005/0096807 | A1 | * | 5/2005 | Murray et al. | 701/29 |
| 2006/0185180 | A1 | * | 8/2006 | MacKelvie | 33/203.18 |
| 2011/0203126 | A1 | * | 8/2011 | Smith | 33/203.18 |
| 2013/0110314 | A1 | * | 5/2013 | Stieff | 33/228 |
| 2013/0239420 | A1 | * | 9/2013 | Kroll et al. | 33/228 |

* cited by examiner

*Primary Examiner* — Yaritza Guadalupe-McCall
(74) *Attorney, Agent, or Firm* — Skinner and Associates; Joel D. Skinner

(57) ABSTRACT

A laser square gauge for use with an automobile for measuring camber, toe and wheel offset. The laser square gauge generates a vertical laser datum line off of the wheel. The visible line replaces the cumbersome use of jigs and string lines. The gauge is operable by a single user and generates an accurate, repeatable reference. The reference can be used to easily measure camber, offset, toe-in and toe-out of the other wheels, as well as car body and frame dimensions. The gauge permits easy maintenance of records to check set-up dimensions of each car for each environment, such as a race track. The gauge is particularly useful for setting up the alignment and suspension of high performance racing automobiles.

18 Claims, 10 Drawing Sheets

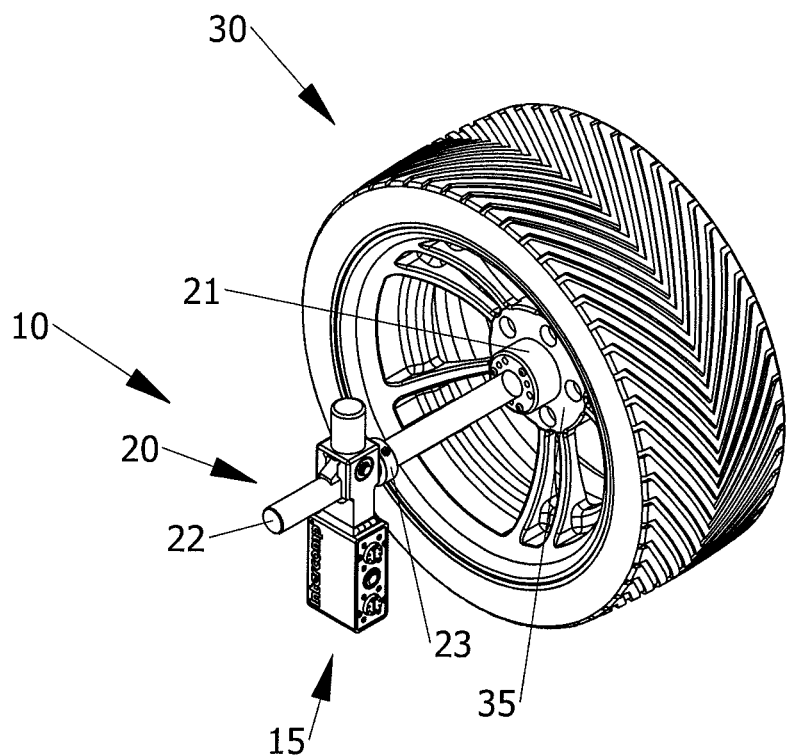
Fig. 1
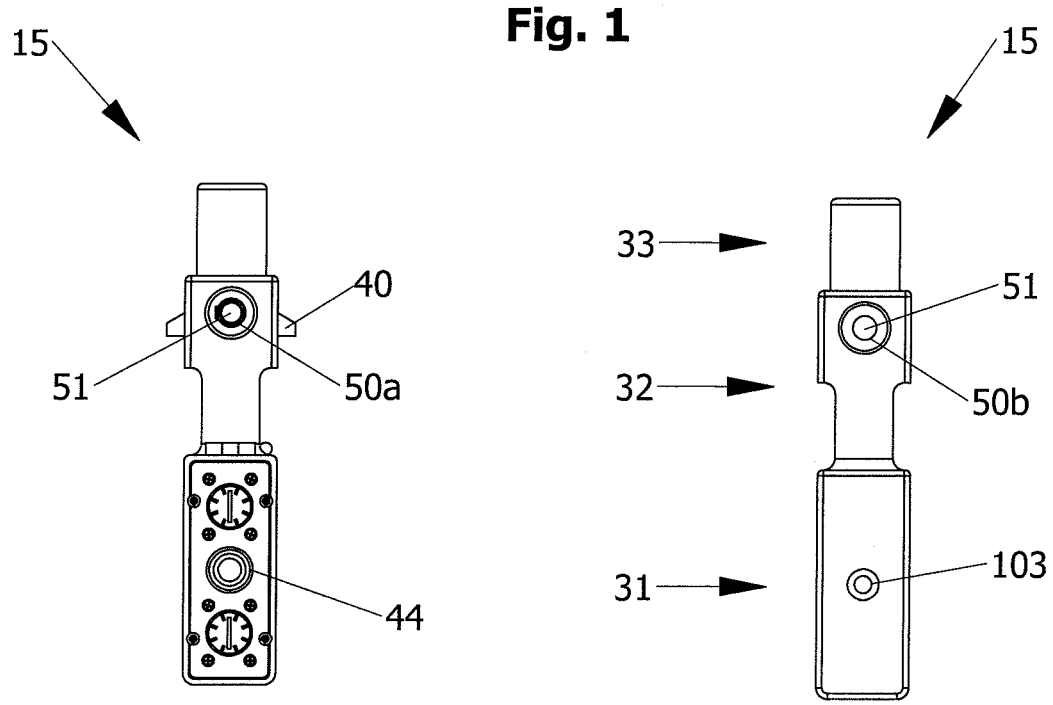
Fig. 2  Fig. 3

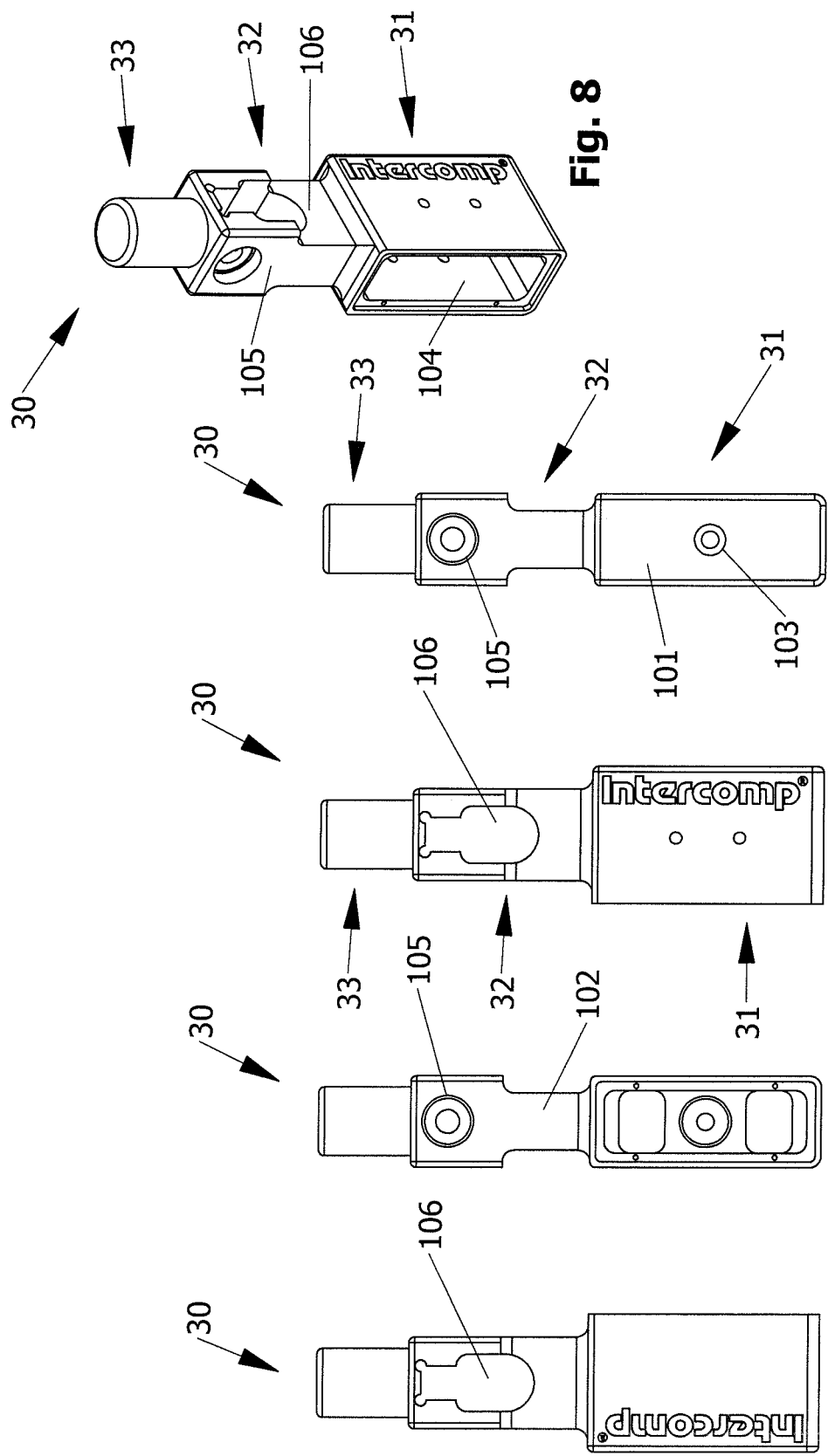

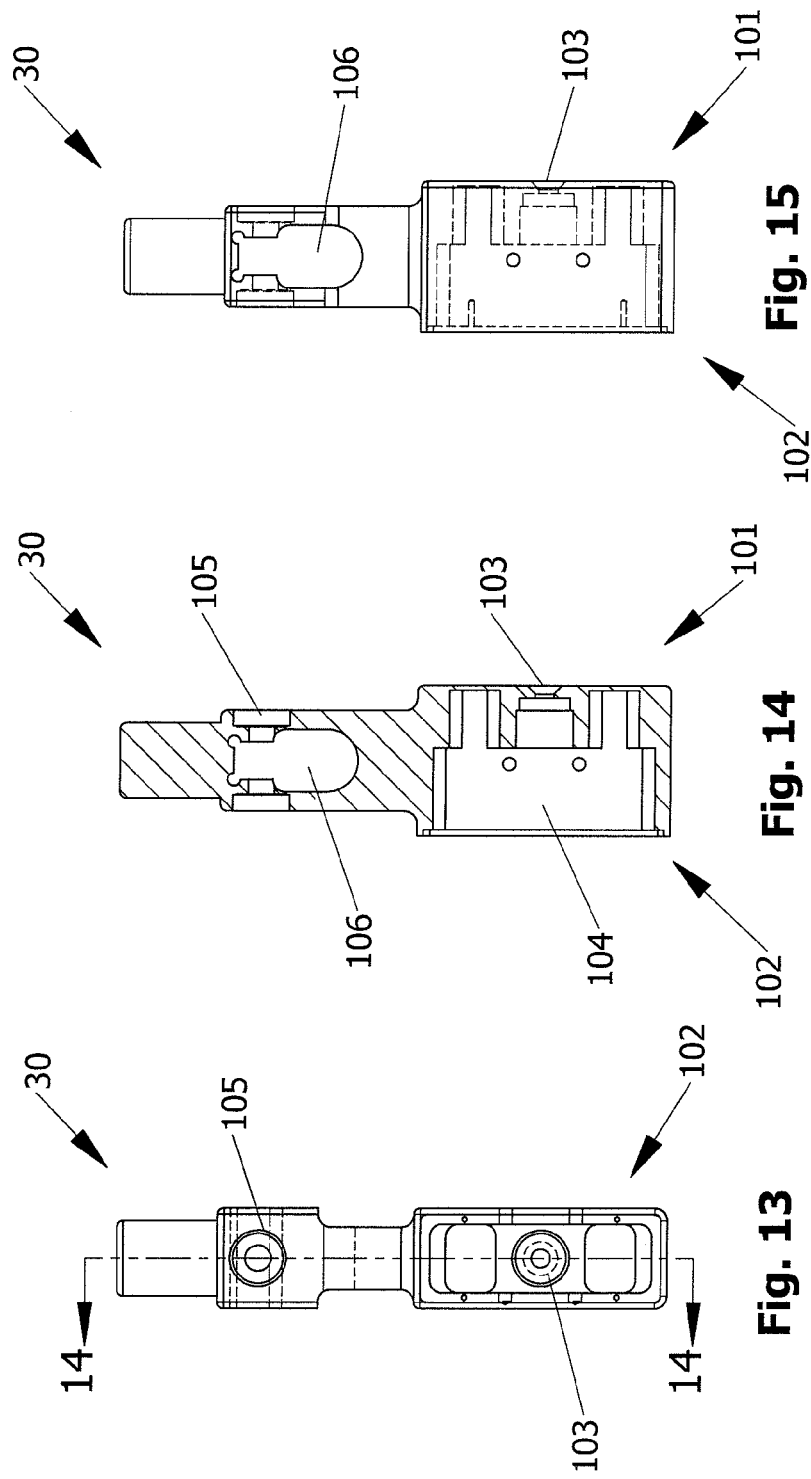

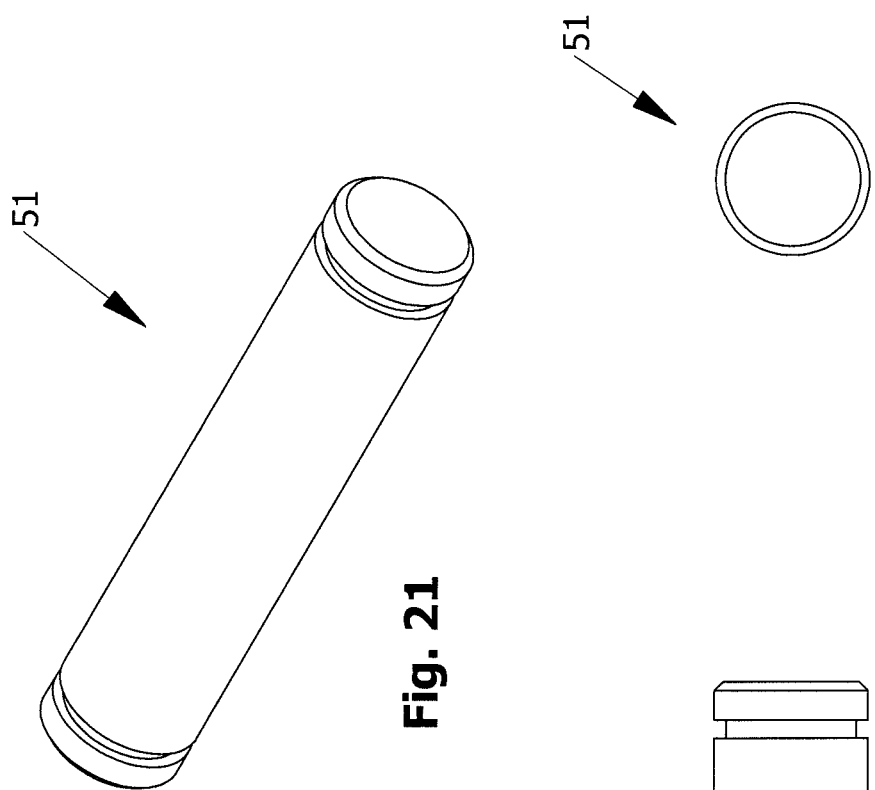
Fig. 21
Fig. 23
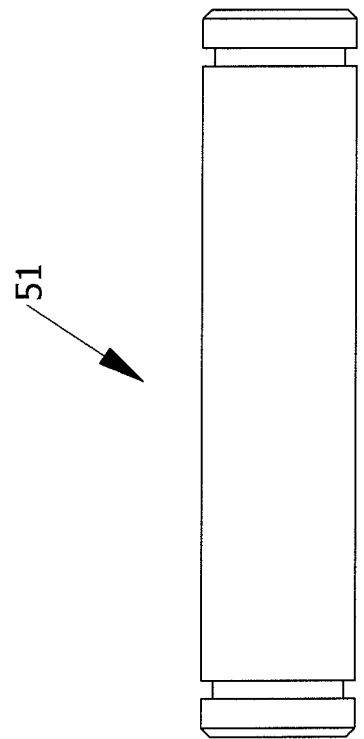
Fig. 22

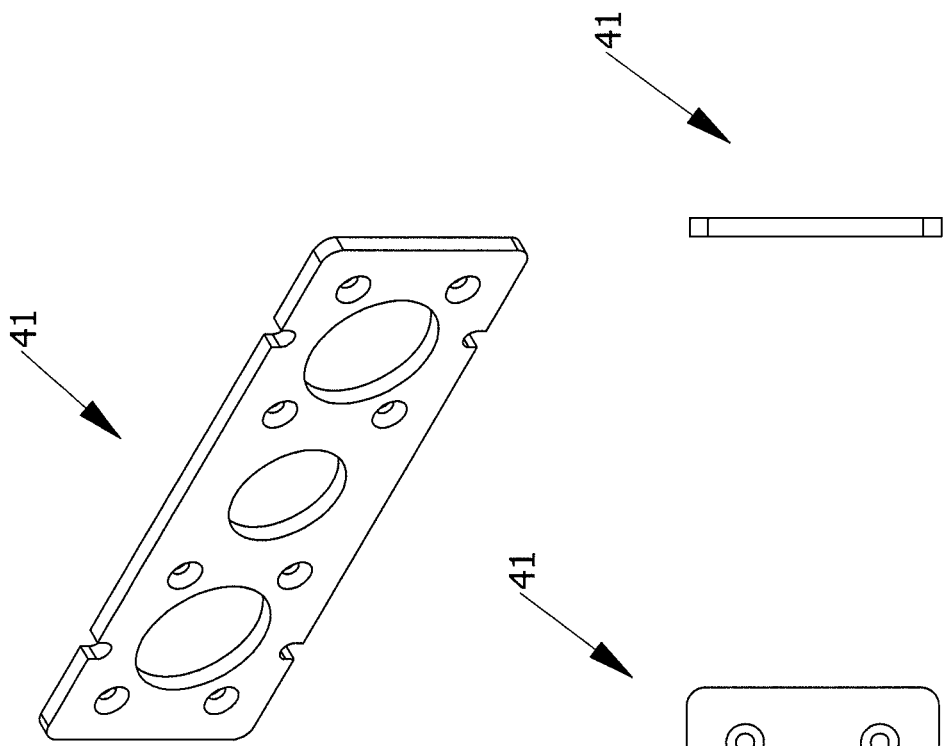
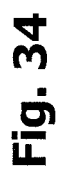
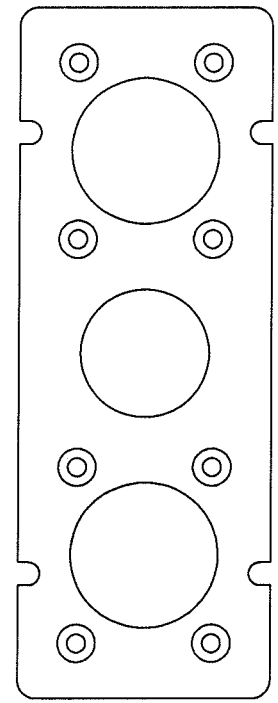
Fig. 32
Fig. 34
Fig. 33

VEHICLE WHEEL ALIGNMENT TECHNOLOGY

CROSS-REFERENCE TO RELATED APPLICATIONS, IF ANY

This application claims the benefit under 35 U.S.C. §119 (e) of U.S. Provisional Patent Application Ser. No. 61/604, 642, filed Feb. 29, 2012, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to systems, apparatus and methods for aligning the wheel and steering systems of vehicles such as cars, trucks and the like. Particularly, the invention relates systems, apparatus and method to measure camber, toe and wheel offset. Most particularly, the invention relates to a laser square gauge for use in setting up the alignment and suspension of high performance race cars with respect to a particular race track.

2. Background Information

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a laser square gauge apparatus and method which are practical, reliable, accurate and efficient, and which is believed to fulfill the need and to constitute an improvement over the background technology. The laser square gauge is for use with a vehicle, such as an automobile, racing vehicle or the like, for measuring vehicle squareness, camber, toe and wheel offset. The laser square gauge generates a vertical laser datum line off of the wheel. The visible line replaces the cumbersome use of jigs and string lines. The gauge is operable by a single user and generates an accurate, repeatable reference. The reference can be used to easily measure camber, offset, toe-in and toe-out of the other wheels, as well as car body and frame dimensions. The gauge permits easy maintenance of records to check set-up dimensions of each car for each environment, such as a race track. The gauge is particularly useful for setting up the alignment and suspension of high performance racing automobiles.

In one aspect, the invention provides a vehicle adjustment system comprising an adapter for connection to a vehicle, the adapter including at least one curvilinear support surface, and a light emitting gauge adapted to be communicatively coupled to the adapter, the gauge including at least one curvilinear connection surface adapted to mate with the curved support surface of the adapter, the gauge further having a body which hangs from the curved connection surface, and the gauge further having a light emitter for emitting a light beam.

In a further aspect, the invention provides a laser gauge adapted to be communicatively coupled to the an automobile to adjust alignment of the vehicle, the laser beam serving as a reference point to make measurements with respect to the vehicle, the gauge comprising at least one curvilinear connection surface adapted to mate with a curved support surface or the automobile directly or via an adapter, the gauge further having a body which hangs from the curved connection surface, and the gauge further having a laser for emitting a reference light beam upon which measurements may be made relative to the vehicle.

In another aspect, the invention provides a method of aligning a vehicle, comprising the steps of:
 a. providing an adapter including a connector and shaft extending from the connector, the shaft having a curvilinear support surface;
 b. connecting the connector to a wheel hub of the vehicle
 c. providing a light emitting gauge including at least one curvilinear connection surface adapted to mate with the curved support surface of the adapter, the gauge further having a body which hangs from the curved connection surface, and the gauge further having a light emitter for emitting a light beam;
 d. coupling the gauge to the shaft of the hub;
 e. actuating the gauge whereby it emits a light reference point; and
 f. making at least one measurement with respect to the vehicle based on the light reference point.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 1 illustrates an embodiment of a laser square gauge used in aligning the wheels and steering system of a vehicle, in an exemplary state communicatively connected to a wheel hub of the vehicle via a hub adapter.

FIG. 2 is a front view of the laser square gauge of FIG. 1.

FIG. 3 is a rear view of the laser square gauge.

FIG. 8 is a perspective view of an embodiment of a body of the laser square gauge.

FIG. 9 is a front view of the laser square gauge body.

FIG. 10 is a back view of the laser square gauge body.

FIG. 11 is a side view of the laser square gauge body.

FIG. 12 is an opposite side view of the laser square gauge body.

FIG. 13 is another back view of the laser square gauge body showing preferred dimensions for this embodiment.

FIG. 14 is a crossectional view of the main body of the laser square gauge body taken along line 14-14 of FIG. 13.

FIG. 15 is a another side view of the main body of the laser square gauge body, further showing interior cavity structures in phantom.

FIG. 16 is a top view of the laser square gauge body.

FIG. 21 is a perspective view of a pivot pin of the laser square gauge.

FIG. 22 is a side view of the pivot pin.

FIG. 23 is an end view of the pivot pin.

FIG. 32 is a perspective view of an embodiment of a back cover of the laser square gauge.

FIG. 33 is front view of the back panel.

FIG. 34 is a side view of the back panel.

DETAILED DESCRIPTION

Figure 4:
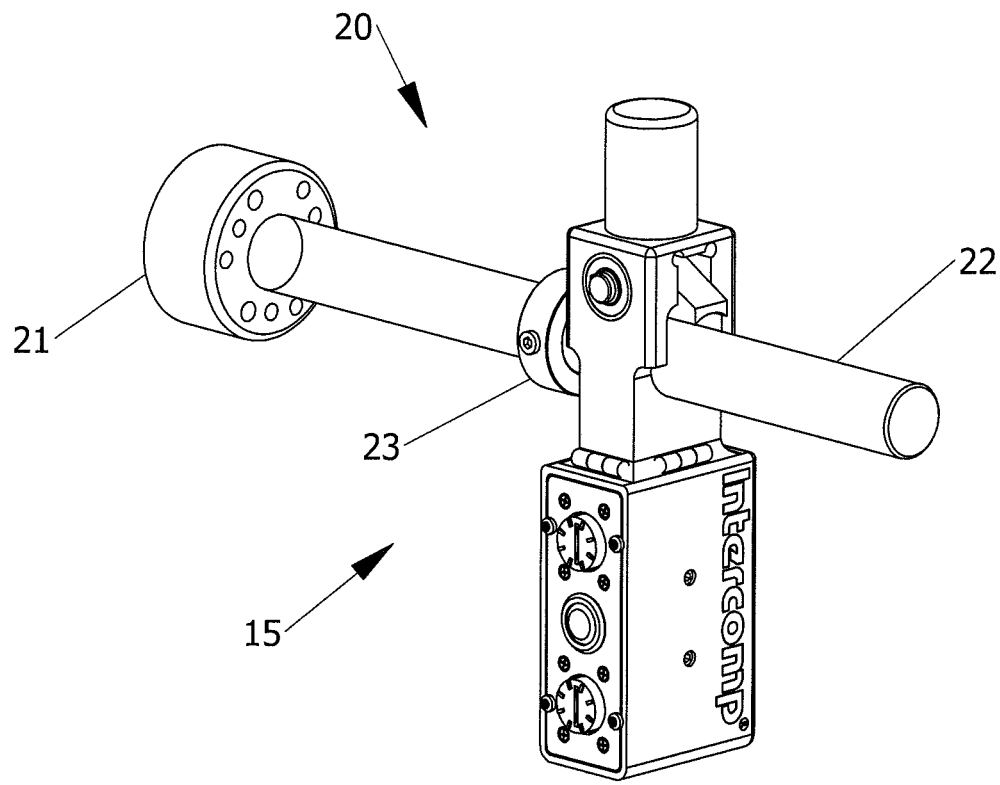
FIG. 4 is a perspective view of the laser square gauge connected to a universal hub adapter.

The invention provides a laser square gauge for use with an automobile for determining whether a vehicle is square, and for measuring camber, toe and wheel offset. The laser square gauge generates a vertical laser datum line off of the wheel. The laser square gauge may also be attached to the drive shaft of a vehicle or to the bar on the back of a vehicle. The visible line replaces the cumbersome use of jigs and string lines. The gauge is operable by a single user and generates an accurate, repeatable reference. The reference can be used to easily measure camber, offset, toe-in and toe-out of the other wheels, as well as car body and frame dimensions. The gauge permits easy maintenance of records to check set-up dimensions of each car for each environment, such as a race track. The gauge is particularly useful for setting up the alignment and suspension of high performance racing automobiles, both for general tuning and alignment and for tuning to the characteristics of a particular race track or course.

Referring to FIGS. 1-4 a first embodiment of the laser square gauge system 10 of the present invention, operatively connected to a vehicle. The gauge 10 includes a gauge 15 and an adapter 20. The adapter 20 is connected to the wheel 30 hub 35 of a vehicle. The adapter 20 extends outwardly from the hub 35.

Figure 5:
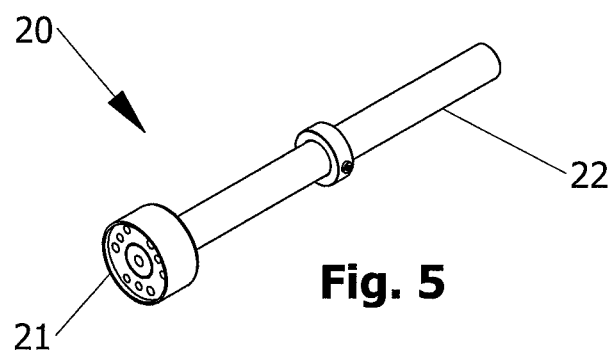
FIG. 5 is a perspective view of an embodiment of a hub adapter for connection to the rear wheel hub of a vehicle.
Figure 6:
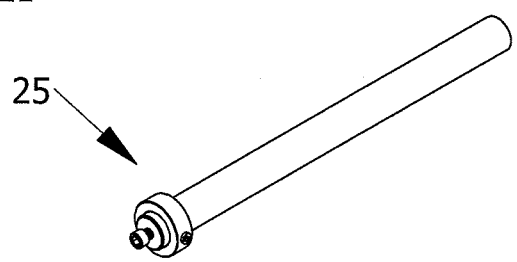
FIG. 6 is a perspective view of an alternative adapter, a front post adapter.

Referring to FIGS. 4 and 5, one embodiment of the adapter 20 is for connection to the rear wheel 30 of a vehicle at the hub 35 thereof. The adapter 20 comprises a hub connector 21 and a shaft 22 which extends from the connector 21 a predetermined distance. A locking collar 23 is movably disposed on the shaft 22 to facilitate adjustable and stable positioning of the gauge 15 at a predetermined position on the shaft 22. FIG. 6 shows an alternative adapter 25 for connection to the front of a vehicle for example.

Referring again to FIGS. 1 and 4, the gauge 15 is coupled to the adapter 20 by sliding the gauge 15 onto the free distal end of the shaft 22 and slidably moving gauge 15 to a predetermined position thereon. The locking collar 22 may be used to abut the gauge 15 and hold it in position.

Figure 7:
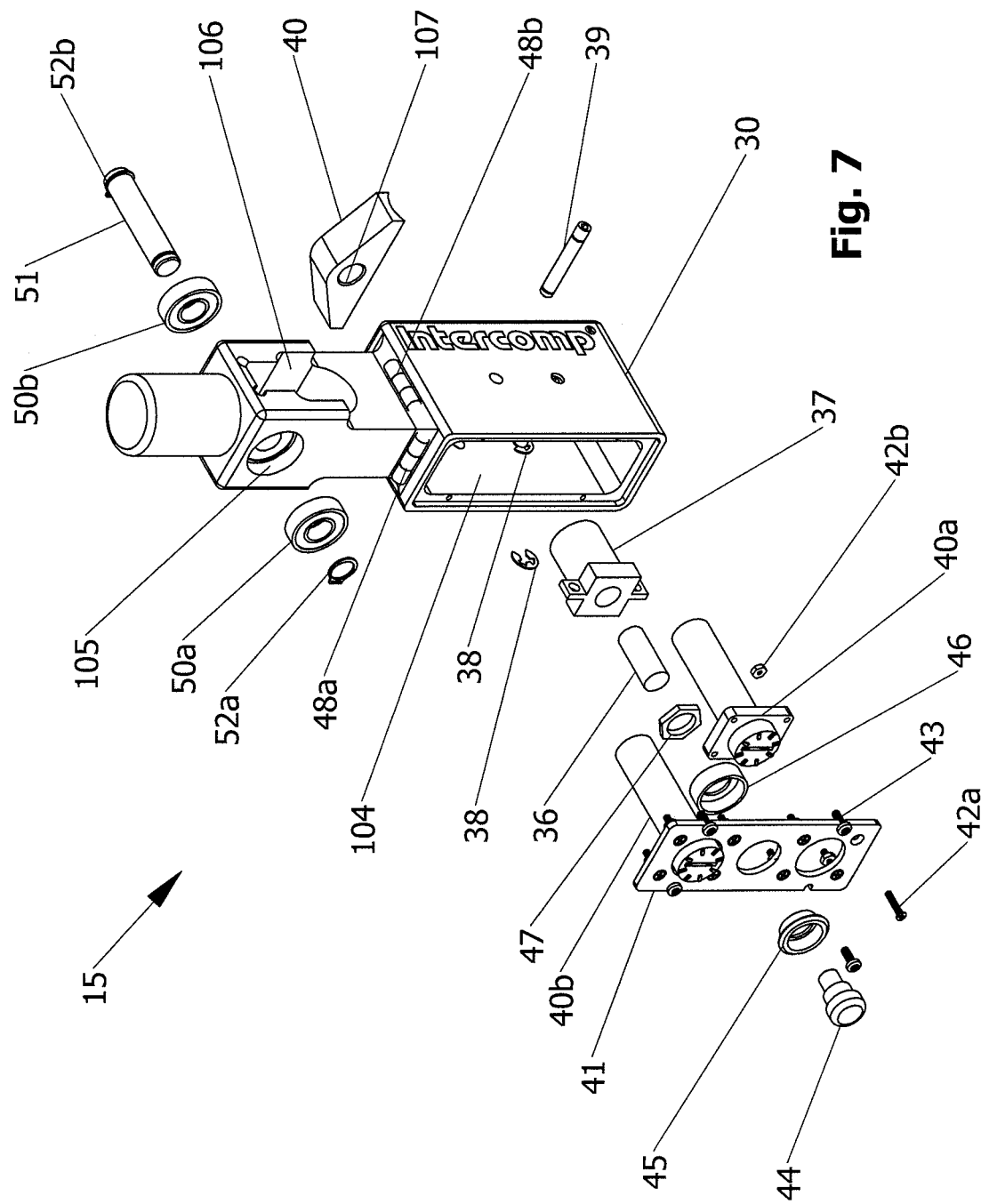
FIG. 7 is an exploded view of the laser square gauge showing substantially all of the external and internal components of the gauge.
Figure 19:
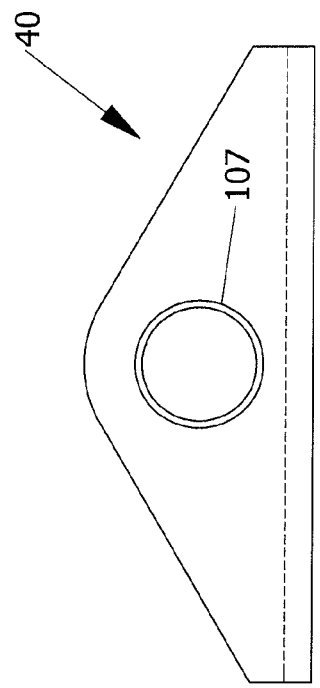
FIG. 19 is a top view of the top member.
Figure 17:
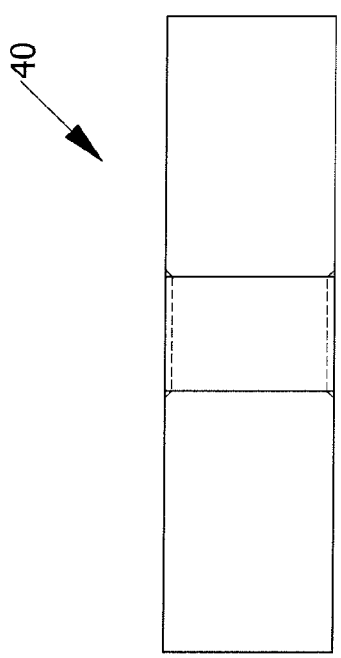
FIG. 17 is a perspective view of an embodiment of top pivot member of the laser square gauge.
Figure 18:
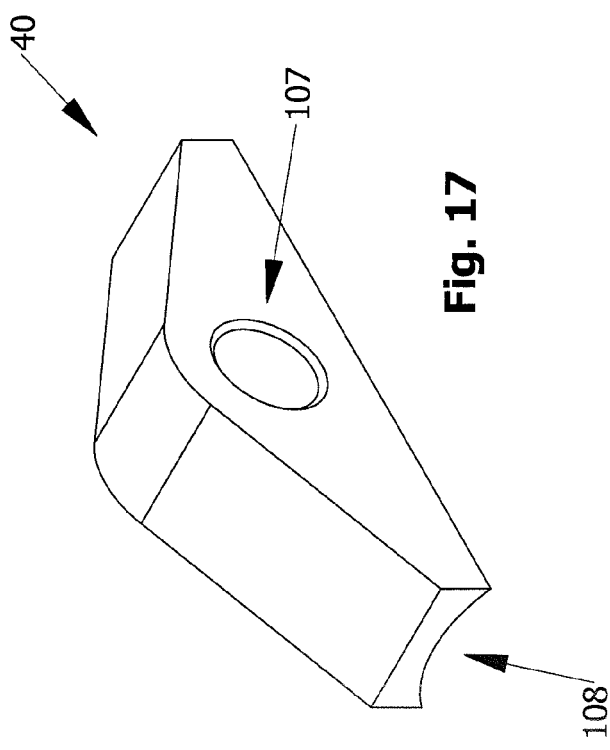
FIG. 18 is a front view of the top pivot member.
Figure 20:
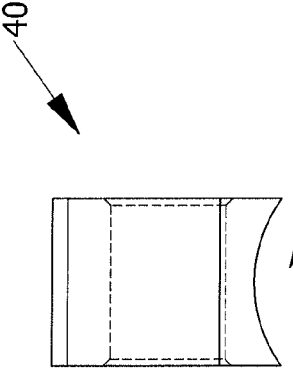
FIG. 20 is an end view of the top member.
Figure 24:
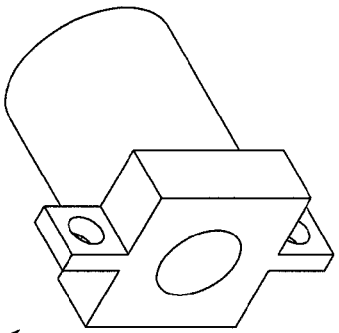
FIG. 24 is a perspective view of an embodiment of a laser holder of the laser square gauge.
Figure 25:
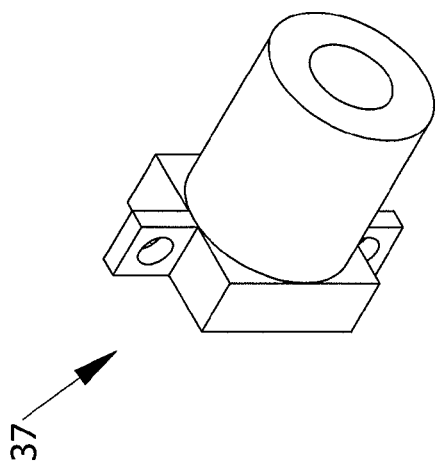
FIG. 25 is another perspective view of the laser holder.
Figure 27:
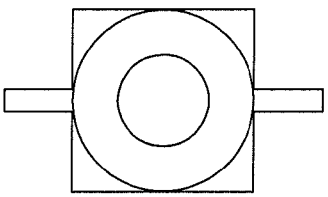
FIG. 27 is an end view of the laser holder.
Figure 26:
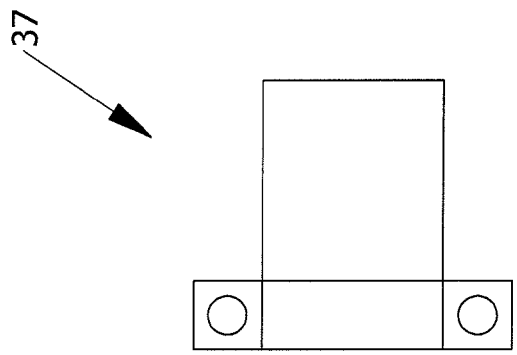
FIG. 26 is a side view of the laser holder.
Figure 28:
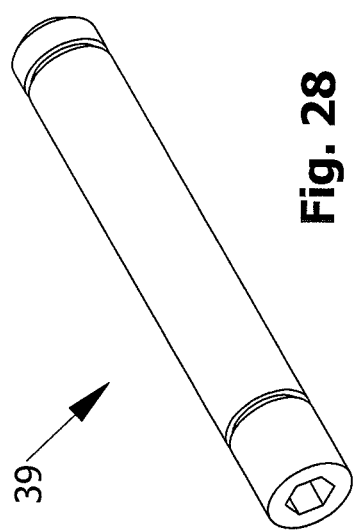
FIG. 28 is a perspective view of an embodiment of an adjustment screw of the laser square gauge.

Referring to FIGS. 2, 3 and 7, the gauge 15 comprises a body 30, internal components located inside the body 30 including power and laser components, a top pivot member 40 which serves as a pivotal interface between the body 30 and the adapter 20, and a pivot pin 50 which enables the body to pivot in a plane perpendicular to a plane of pivot of the body 30 with respect to the top pivot member 40.

Referring also to FIGS. 8-16, the body 30 has lower, middle and upper portions 31, 32 and 33 respectively. The generally rectangular, box-shaped lower portion has a front face 101 and a back face 102. The front face 101 has an aperture 103 from which the laser beam is emitted in the desired direction. The back face 102 has a back cover 41 which covers an interior compartment 104. The middle portion 32 is connected to the lower portion 31. It has means to pivotally connect the gauge 15 to the adapter so that it can hang freely, pivot along at least 2 axis, and permit the laser to establish a datum line in a variety of vehicles and vehicle environments. The upper portion 33 is cylindrical and extends from the top of the middle portion 32. It functions as a counter weight to facilitate free pivoting movement so that the laser hangs plumb, level and square. The body 30 is constructed of a rigid material or materials, preferably metal(s).

Returning to FIG. 7, the additional components of the gauge 15 include a laser module 36 which is supported by a laser holder 37, which aligns the laser module 36 with the emission aperture 103. The holder 37 is connected to the body 30 by one or more E clips 38. The holder 37 position is adjustable by way of an adjustment screw 39. A pair of battery holders 40 a/b holds one or more batteries which supply power to the laser module 36. The battery holders 40 are attached to a cover 41 via screws and nut 42a/b. The cover 41 is in turn connected to the body 30 to cover the aperture 104 by screw 43. The laser 36 is actuated by a push button on/off switch 44, which is secured by a switch guard 45 and cup 46 by retaining nut 47.

The middle portion 32 of the body 30 has intersecting apertures. Front-Back aperture 105 (longitudinally oriented with respect to vehicle, for lateral pivot with respect to vehicle) houses a pair of bearings 50a and 50b connected to pivot pin 51, which is held by retaining rings 52a/b. Side-Side aperture 106 (laterally oriented with respect to vehicle, for longitudinal pivot with respect to vehicle) houses top pivot 40. Top pivot 40 has aperture 107 which intersects with the pivot pin 51. Top pivot 40 has a curved bottom surface 108 which mates with the surface of the shaft 22 of the adapter 20 (not shown here). Acrylic via levels 48a and 48b are disposed on the exterior of the body 30 in opposing axis or planes of pivot.

FIGS. 17-20 show a preferred embodiment of the top pivot member 40. The pivot member 40 has a generally triangular configuration with a curved apex and truncated ends. Lateral aperture 107 mates with pivot pin 50. Pivot member 40 has a longitudinally extending bottom surface 108 which is curved laterally or from side to side and is adapted to pivotally mate with the surface of the hub 20 shaft 22. The geometry of the top pivot member 40 also permits pivotal movement of the body 30 about pivot shaft 51. The combination of the structure, interconnection, and function of the longitudinal and lateral apertures 106 and 107, the longitudinal pivot means 108 (of member 40), lateral pivot means of pin 51 and member 40 enables the laser square to hang freely and pivot both longitudinally and laterally with respect to the vehicle.

FIGS. 21-23 show a preferred embodiment of the pivot pin 14. FIGS. 24-27 show a preferred embodiment of the laser holder 37. FIGS. 28-31 show a preferred embodiment of the adjustment screw 39. And FIGS. 32-34 show a preferred embodiment of the cover 41.

Overview

The Laser Square Gauge 10 provides a means of establishing and generating a vertical laser datum line off of the wheel 30, drive shaft or other component of a vehicle. This visible datum line replaces the cumbersome use of jigs and string lines with a one-man, visible and repeatable reference that can then be used to easily measure camber, offset and toe-in or toe-out of the other wheels, as well as the vehicle body and frame dimensions. Records can be maintained to check set-up dimensions for each race track in the case of high performance racing vehicles.

Operation

The laser is pre-set and calibrated to produce a vertical line. This can be checked with a transit, plumb bob or against the edge of a 4' or longer carpenter's level placed vertically in front of the laser line. If the laser line is discovered not to be vertical it can be recalibrated. A preferred method of using the laser square gauge 10 is as follows.

1. Mount the Hub Adapter 20 on the right rear hub 30 of the vehicle, for example a race car.
2. Place the locking collar 23 on the hub adapter 20 shaft 22 at an established distance (for example 2.00") along the shaft 22 from the outer edge of the hub adapter and tighten the locking collar 23 set screw. The inside edge of the locking collar should be the same distance from the edge of the hub at all points.
3. Place the Laser Square Gauge 15 over the hub adapter shaft 22 and against the locking collar 23 through the 1¼" hole in the swing arm pivot (top pivot member 40 and aperture 106) that runs perpendicular to the direction of the laser beam emitted from laser module 36. Ensure that the area down range of the laser is clear of all personnel and that there is a solid surface at the end of the range to prevent accidental entry into the laser area of transmission.
4. Press the power switch 44 to turn on the Laser Square Gauge 15.
5. Move the laser square gauge 15 forward and side to side until the two bubble levels 48 on the back and side of the gauge body 30 are centered. To verify if the laser is on, place a solid object in front of the laser, but the operator should refrain from viewing the laser beam directly.
6. With the user's back to the laser, he or she can now verify measurements by extending a tape measure (not shown) or other measuring device perpendicular from the vehicle 30 and reading the distance from where the laser is shown on the tape measure.

Measuring Camber

To measure camber, mount the laser gauge 15 with hub assembly 20 to the front hub to measure the rear wheel or mount to the rear hub to measure the front wheel.

1. Hang the laser square gauge 15 on the appropriate wheel 30.
2. Measure the diameter of the rim of the wheel 30.
3. Turn the Laser Square Gauge 15 on.
4. Move the laser square gauge 15 forward and side to side until the two bubble levels 48 on the back and side of the gauge body 30 are centered.
5. Extend a tape measure parallel from the ground from the upper most point of the rim to the laser square gauge line. Annotate the reading.
6. Extend a tape measure parallel from the ground from the lower most point of the rim to the laser square gauge line. Annotate the reading.
7. Subtract the reading in step 5 from the reading in step 6 or step 6 from step 5, whichever is greater.
8. Calculate the angle using the following formula:

Sin Inverse of (reading step 7/reading step2)=camber angle.

The sign of the camber angle is dependent on whether the top of the tire 30 is tipped towards or away from the center of the vehicle. If the top of the tire 30 is towards the center of the vehicle the camber angle would be negative. If the top of the tire 30 leans away from the center of the vehicle the camber angle is positive.

Measuring Toe

To properly measure the toe angle of a wheel, the distance from the center line of the vehicle to two (2) reference points on the side of the vehicle must be known. For example, if there is a straight member of the frame that runs from the front of the vehicle to the rear this can be used as a reference to the center of the vehicle. Mark two (2) points (one front one rear) and use these to as references to measure from.

1. For measuring toe of front wheels follow steps 2-3 if measuring rear wheels proceed to step 4.
2. Align steering to centered location (typically the same position used for bump steer).
3. Lock vehicle steering (as you would when setting bump steer).
4. Mount a hub adapter 20 to the wheel 30 the operator is measuring.
5. Hang the Laser Square Gauge 15 on the adapter 20.
6. Measure the distance between the two (2) reference points on the side of the vehicle.
7. Annotate the reading.
8. Turn the Laser Square Gauge 15 on.
9. Move the laser square gauge 15 forward and side to side until the two bubble levels 48 on the back and side of the gauge body 30 are centered.
10. Extend a tape measure parallel to the ground from the first reference point on the side of the vehicle to the laser square gauge line. Annotate the reading.
11. Extend a tape measure parallel to the ground from the second reference point on the side of the vehicle to the laser square gauge line. Annotate the reading.
12. Calculate the difference of step 5 and step 6. Annotate the difference. On rear wheels, if the furthest reference point reading from the laser square is larger than the closer reference point a toe out situation is indicated. On front wheels, if the furthest reference point reading from the laser square is larger than the closer reference point a toe in situation is indicated.
13. Calculate the toe angle using the following formula:

Tangent Inverse (reading step 12/reading step 6)=toe angle.

Add the toe angle from each wheel as required to get the total toe of an axel set.

Measuring Offset/Wheel Alignment

Once toe angle of a wheel 30 is measured and set the offset of the wheel may also be set using a similar technique.

1. Mount a hub adapter 20 to the rear wheel 30 (or wheel to be measured).
2. Hang the Laser Square Gauge 15 on the adapter 20 and lock the locking collar 23 in place.
3. Turn the Laser Square Gauge 15 on. Make sure it is shining in the direction of the front wheel (rear if mounted to the front) using the tape measure as a solid object.
4. Level the bubbles 48.
5. Measure from the laser to a user defined wheel reference on the wheel the laser is mounted. Annotate the readings.
6. Extend a tape measure parallel from the ground from the user defined wheel reference point on the opposite wheel to the laser square gauge line. Annotate the readings.
7. Extend a tape measure parallel from the ground from the furthest reference point on the side of the vehicle to the laser square gauge line. Annotate the readings.

Use the reference points on the chassis described in the measuring toe section above.

8. Extend a tape measure parallel from the ground from the nearest reference point on the side of the vehicle to the laser square gauge line. Annotate the readings.

Use the reference points on the chassis described in the measuring toe section above.

9. If the measurements in steps 7 and 8 indicate a zero toe condition offset is simple to calculate.

Offset=value from step 5−value from step 6

(negative offset=rear offset left)

10. If the measurements in steps 7 and 8 are not the same indicating toe either calculate the difference the tow makes in the offset or adjust the toe out of the suspension and re-measure the offset of the wheels.

Difference=Tan (Toe angle)*(Wheel base of the side measured)

Changing the Battery

Turn the power off. Twist the battery holder 40a/b doors 90° counter-clockwise. Remove the AA battery in each holder 40 and replace. Insert the battery so that the positive end is facing up. Replace the battery covers by lining up the slots and turning the door 90° clockwise.

Figure 30:
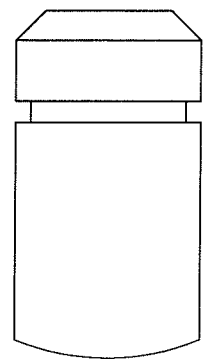
FIG. 30 is a detailed view of the adjustment screw taken at area—30—of FIG. 29.
Figure 29:
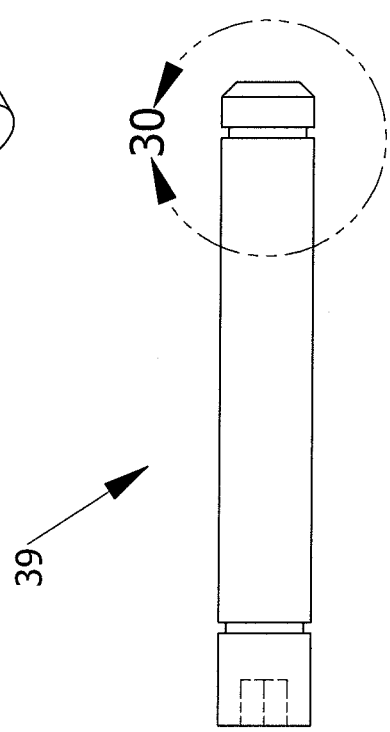
FIG. 29 is a side view of the adjustment screw.

FIGS. 29 and 30 show a second embodiment of the laser square gauge 200 of the invention. The gauge 200 comprises a bearing 210, a spherical bearing 211, a hub adapter 212, and a axle collar 213.

Figure 31:
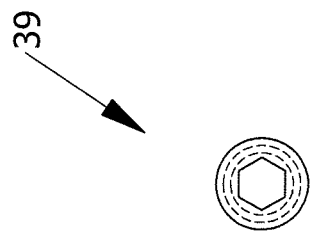
FIG. 31 is an end view of the adjustment screw.

FIG. 31 shows a third embodiment of the laser square gauge 300 of the invention. The gauge 300 comprises a hub adapter 310, an axle collar 311, an axle slide tube 312, a body weldment 313 and a loading pin 314.

FIG. 32 shows a fourth embodiment of the laser square gauge 400 of the invention. The gauge 400 comprises a body weldment 410, a loading pin 411 and a hub adapter 412.

FIG. 33 shows a fifth embodiment of the laser square gauge 500 of the invention. The gauge 500 comprises a hub adapter 510, an axle collar 511, an axle slide weldment 512, a body 513, a bearing 514 and a detent pin 515.

FIG. 34 shows a sixth embodiment of the laser square gauge 600 of the invention. The gauge 600 comprises an adapter hub 610, a bearing 611, a hub ad adapter shaft 612, a body 613, a screw 614, a washer 615 and a detent pin 616.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A vehicle adjustment system comprising:
an adapter or connection to a vehicle, the adapter including at least one curvilinear support surface, and
a light emitting gauge adapted to be communicatively coupled to the adapter, the gauge including at least one curvilinear connection surface adapted to mate with the curvilinear support surface of the adapter, the gauge further having a body which hangs from the curvilinear connection surface, and the gauge further having a light emitter for emitting a light beam; the body having a connection portion adapted to be connected to the adapter and a base portion connected to the connection portion, the base portion supporting the light emitter, and wherein the connection portion includes a pivot member, the pivot member including the connection surface of the gauge, wherein the connection surface is a downwardly facing surface of the pivot member which rests upon the upwardly facing support surface of the adapter, and wherein the pivot member is pivotally moveable in a first plane about the support surface, and wherein the gauge is pivotally movable in a perpendicular second plane with respect to the pivot member.

2. The system of claim 1, wherein the system is for use with a vehicle to adjust alignment of the vehicle, a light bean emitted from the light emitter in use serving as a reference point to make measurements with respect to the vehicle.

3. The system of claim 1, wherein the adapter is adapted to be connected to a wheel hub of the vehicle.

4. The system of claim 3, wherein the adapter includes a connector adapted to be connected to the wheel hub, and a cylindrical shaft extending from the connector a predetermined distance, and wherein the surface of the shaft is the adapter support surface which mates with the gauge connection surface, the connection surface being pivotally movable with respect to the support surface.

5. The system of claim 1, wherein the light emitter of the gauge is a laser.

6. The system of claim 1, wherein the curvilinear connection surface of the gauge is a downwardly facing surface which rests upon the upwardly facing curvilinear support surface of the adapter.

7. The system of claim 1, wherein the gauge includes a pivot pin which mates with the pivot member, and about which the gauge moves in the second plane.

8. The system of claim 7, wherein the pivot member has wedge shaped configuration with a triangular shaped top with a curvilinear top apex and truncated ends, a bottom surface which is curved from front to back along its length, and an aperture for mating with the pivot pin.

9. The system of claim 1 for use with a vehicle to adjust alignment of the vehicle, the light beam being a laser and serving as a reference point to make measurements with respect to the vehicle, wherein the adapter is adapted to be connected to a wheel hub of the vehicle, and includes a connector adapted to be connected to the wheel hub, and a cylindrical shaft extending from the connector a predetermined distance, and wherein the surface of the shaft is the adapter support surface which mates with the gauge connection surface, the connection surface being pivotally movable with respect to the support surface;

and wherein the gauge includes a pivot pin which mates with the pivot member, and about which the gauge moves in the second plane.

10. The system of claim 9, wherein the pivot member has wedge shaped configuration with a triangular shaped top with a curvilinear top apex and truncated ends, a bottom surface which is curved from front to back along its length, and an aperture for mating with the pivot pin.

11. A laser gauge adapted to be communicatively coupled to an automobile to adjust alignment of the vehicle, the laser beam serving as a reference point to make measurements with respect to the vehicle, the gauge comprising:

at least one curvilinear connection surface adapted to mate with a curved support surface or the automobile directly or via an adapter, the gauge further having a body which hangs from the curved connection surface, and the gauge further having a laser for emitting a reference light beam upon which measurements may be made relative to the vehicle, wherein the body has a connection portion adapted to be connected to the adapter and a base portion connected to the connection portion, the base portion supporting the light emitter, wherein the connection portion includes a pivot member, the pivot member including the connection surface of the gauge, and wherein the connection surface is a downwardly facing surface of the pivot member which rests upon the upwardly facing support surface of the adapter, and wherein the pivot member is pivotally moveable in a first plane about the support surface, and wherein the gauge is pivotally movable in a perpendicular second plane with respect to the pivot member;

the adapter including a connector adapted to be connected to the wheel hub, and a cylindrical shaft extending from the connector a predetermined distance, and wherein the surface of the shaft is the adapter support surface which mates with the gauge connection surface, the connection surface being pivotally movable with respect to the support surface.

12. The gauge of claim 11, wherein the connection surface of the gauge is a downwardly facing surface which rests upon the upwardly facing support surface of the adapter.

13. The gauge of claim 11, wherein the gauge includes a pivot pin which mates with the pivot member, and about which the gauge moves in the second plane.

14. The gauge of claim 13, wherein the pivot member has wedge shaped configuration with a triangular shaped top with a curvilinear top apex and truncated ends, a bottom surface which is curved from front to back along its length, and an aperture for mating with the pivot pin.

15. The gauge of claim 11, wherein:
a. the gauge body has a connection portion adapted to be connected to the adapter and a base portion connected to the connection portion, the base portion supporting the light emitter; and
b. the connection portion includes:
i. a pivot member, the pivot member including the connection surface of the gauge, and wherein the connection surface is a downwardly facing surface of the pivot member which rests upon the upwardly facing support surface of the adapter, the pivot member being pivotally moveable in a first plane about the support surface, and wherein the gauge is pivotally movable in a perpendicular second plane with respect to the pivot member, and
ii. a pivot pin which mates with the pivot member, and about which the gauge moves in the second plane.

16. The system of claim 15, wherein the pivot member has wedge shaped configuration with a triangular shaped top with a curvilinear top apex and truncated ends, a bottom surface which is curved from front to back along its length, and an aperture for mating with the pivot pin.

17. A vehicle adjustment system, for use with a vehicle to adjust alignment of the vehicle, a light beam being a laser and serving as a reference point to make measurements with respect to the vehicle, comprising:

an adapter for connection to a vehicle, the adapter including at least one curvilinear support surface, and a light emitting gauge adapted to be communicatively coupled to the adapter, the gauge including at least one curvilinear connection surface adapted to mate with the curvilinear support surface of the adapter, the gauge further having a body which hangs from the curvilinear connection surface, and the gauge further having a light emitter for emitting a light beam, wherein:
a. the adapter is adapted to be connected to a wheel hub of the vehicle, and includes a connector adapted to be connected to the wheel hub, and a cylindrical shaft extending from the connector a predetermined distance, and wherein the surface of the shaft is the adapter support surface which mates with the gauge connection surface, the connection surface being pivotally movable with respect to the support surface;
b. the gauge body has a connection portion adapted to be connected to the adapter and a base portion connected to the connection portion, the base portion supporting the light emitter; and
c. the connection portion includes:
i. a pivot member, the pivot member including the connection surface of the gauge, and wherein the connection surface is a downwardly facing surface of the pivot member which rests upon the upwardly facing support surface of the adapter, the pivot member being pivotally moveable in a first plane about the support surface, and wherein the gauge is pivotally movable in a perpendicular second plane with respect to the pivot member, and
ii. a pivot pin which mates with the pivot member, and about which the gauge moves in the second plane.

18. A laser gauge adapted to be communicatively coupled to the an automobile to adjust alignment of the vehicle, the laser beam serving as a reference point to make measurements with respect to the vehicle, the gauge comprising:

at least one curvilinear connection surface adapted to mate with a curved support surface or the automobile directly or via an adapter, the gauge further having a body which hangs from the curved connection surface, and the gauge further having a laser for emitting a reference light beam upon which measurements may be made relative to the vehicle, wherein:
  a. the gauge body has a connection portion adapted to be connected to the adapter and a base portion connected to the connection portion, the base portion supporting the light emitter; and
  b. the connection portion includes:
  i. a pivot member, the pivot member including the connection surface of the gauge, and wherein the connection surface is a downwardly facing surface of the pivot member which rests upon the upwardly facing support surface of the adapter, the pivot member being pivotally moveable in a first plane about the support surface, and wherein the gauge is pivotally movable in a perpendicular second plane with respect to the pivot member, and
  ii. a pivot pin which mates with the pivot member, and about which the gauge moves in the second plane; and
wherein the adapter is adapted to be connected to a wheel hub of the vehicle via an adapter including a connector adapted to be connected to the wheel hub, and a cylindrical shaft extending from the connector a predetermined distance, and wherein the surface of the shaft is the adapter support surface which mates with the gauge connection surface, the connection surface being pivotally movable with respect to the support surface.

* * * * *